(12) United States Patent  
Doney et al.

(10) Patent No.: US 6,862,601 B2  
(45) Date of Patent: Mar. 1, 2005

(54) METHOD, SYSTEM, AND PROGRAM FOR TRANSFORMING FILES FROM A SOURCE FILE FORMAT TO A DESTINATION FILE FORMAT

(75) Inventors: Gary Charles Doney, Sunnyvale, CA (US); Michael Morris Golding, Palo Alto, CA (US); Hsin-Liang Huang, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 427 days.

(21) Appl. No.: 09/934,721

(22) Filed: Aug. 22, 2001

(65) Prior Publication Data

US 2003/0140055 A1 Jul. 24, 2003

(51) Int. Cl.[7] .............................................. G06F 17/30
(52) U.S. Cl. ........................... 707/101; 707/100; 707/6; 707/2; 707/1
(58) Field of Search ................................ 707/101, 100, 707/6, 2, 1, 10; 716/11

(56) References Cited

U.S. PATENT DOCUMENTS

| 5,345,586 | A | | 9/1994 | Hamala et al. |
| 5,652,874 | A | * | 7/1997 | Upson et al. ................. 716/11 |
| 6,141,662 | A | * | 10/2000 | Jeyachandran ................. 707/2 |

FOREIGN PATENT DOCUMENTS

| WO | 9853614 | 11/1998 |

OTHER PUBLICATIONS

IBM, Corp. "XMI Toolkit" in *IBM VisualAge for Java, Version 3.5*, 2000, pp. iii–41.

IBM, Corp. "Roundtripping between Rational Rose and VisualAge for Java—Using VisualAge for Java to update and enhance Rational Rose models" in *IBM VisualAge for Java, Enterprise Edition Integrated Scenarios*, 2000, pp. iii–22.

* cited by examiner

*Primary Examiner*—Jean M. Corrielus
(74) *Attorney, Agent, or Firm*—David W. Victor; Konrad Raynes & Victor LLP

(57) ABSTRACT

Provided is a method, system, and program for transforming files from a source file format to a destination file format. A data structure is generated in a computer readable medium indicating available transforms from a plurality of source file formats to at least one destination file format. A graphical representation of available transforms from the source file formats to the at least one destination file format is generated based on the available transforms indicated in the data structure. User input is received indicating a selected source file having a source file format and a selected destination file having a selected destination file format, wherein the data structure indicates one available transform to transform the selected source file format to the selected destination file format. The selected source file in the source file format is transformed to the selected destination file in the destination file format.

51 Claims, 8 Drawing Sheets

| From\To  | Format 1        | Format 2        | Format 3        | Format 4        |
|----------|-----------------|-----------------|-----------------|-----------------|
| Format 1 |                 | c:\..\app2-1.exe |                 | e:\..\app1-4.exe |
| Format 2 | c:\..\app2-1.exe |                 | c:\..\app2-3.exe |                 |
| Format 3 |                 |                 |                 | g:\..\app4-3.exe |
| Format 4 | c:\..\app4-1.exe |                 | h:\..\app4-3.exe |                 |

Transform Table

FIG. 2

METHOD, SYSTEM, AND PROGRAM FOR TRANSFORMING FILES FROM A SOURCE FILE FORMAT TO A DESTINATION FILE FORMAT

BACKGROUND OF THE INVENTION

1. Field of the Invention

The present invention relates to a method, system, and program for transforming files from a source file format to a destination file format.

2. Description of the Related Art

Oftentimes, computer users will want to transform a data file in one format to a another format. This operation may be performed by calling an application program utilizing the source format and using the application program to transform the file to a destination format. For instance, many wordprocessor, spreadsheet, database, and other types of programs use a proprietary file format for their files. Such applications also allow the user to transform a file in the application's proprietary file format to the proprietary format used in a competitor's application. For instance, both Corel WordPerfect and Microsoft Word** allow users to transform files in their proprietary file formats to the file format used by the competing product. Such application programs typically provide access to the file format transformation operation through the "Save As" item on the file menu item.

Notwithstanding such techniques for transforming files, there is a need in the art to provide tools to improve the ease by which users can transform files to different file formats.

SUMMARY OF THE PREFERRED EMBODIMENTS

Provided is a method, system, and program for transforming files from a source file format to a destination file format. A data structure is generated in a computer readable medium indicating available transforms from a plurality of source file formats to at least one destination file format. A graphical representation of available transforms from the source file formats to the at least one destination file format is generated based on the available transforms indicated in the data structure. User input is received indicating a selected source file having a source file format and a selected destination file having a selected destination file format, wherein the data structure indicates one available transform to transform the selected source file format to the selected destination file format. The selected source file in the source file format is transformed to the selected destination file in the destination file format.

In further implementations, generating the graphical representation further comprises generating graphical representations of each file format indicated as one source or destination file format in the data structure and generating a graphical association for each source file format and destination file format pair for which there is one available transform.

Still further, a graphical representation of a transformation operation may be generated to be displayed between a graphical representation of the selected source file format and a graphical representation of the selected destination file format.

The described implementations provide an improved technique for providing information to users on available file format transform operations that utilizes graphical representations of the transforms that may be performed.

BRIEF DESCRIPTION OF THE DRAWINGS

Referring now to the drawings in which like reference numbers represent corresponding parts throughout:

FIG. 2 illustrates a data structure providing information on available transforms for transforming files in a source file format to a destination file format in accordance with implementations of the invention;

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
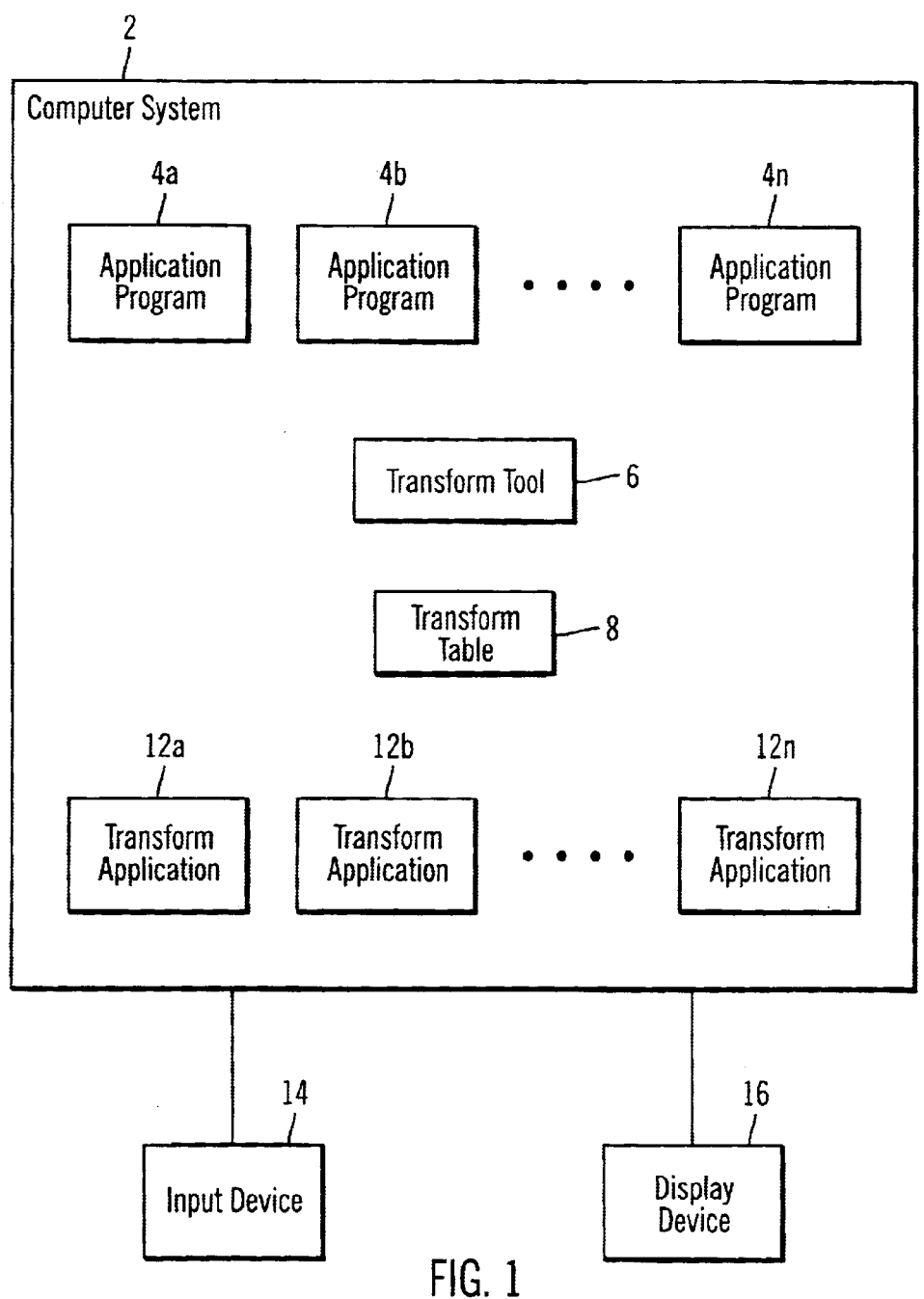
FIG. 1 illustrates a computing environment in which aspects of the invention are implemented.

FIG. 1 illustrates a computing environment in which aspects of the invention are implemented. A computer system 2, which may comprise any computing device known in the art (e.g., a desktop, workstation, laptop, personal digital assistant (PDA), mainframe, server, telephone device, etc), having a processor, memory, storage, and operating system (not shown), includes a plurality of application programs 4a, b . . . n, such as word processing programs, spreadsheet programs, database programs, software development tools, etc. A transform tool 6 is a program that enables users to transform files in one format to another format, such as from one format used by one application program 4a, b . . . n to a format used by another application program 4a, b . . . n. To provide users information on the transforms available for different file formats, the transform tool 6 generates a transform table 8 that indicates the transform operations that may be performed by transformation applications 12a, b . . . n. Each transformation application 12a, b . . . n includes executable code to transform files in one or more source formats to one or more other destination formats.

The computer system 2 further includes an input device 14, such as one or more of a mouse, keyboard, microphone and voice translator, pen stylus, touch sensitive display monitor, etc. and a display device 16, such as a computer monitor.

FIG. 2 illustrates an example of the n×n transform table 8 having one row and one column for each format for which a transformation is provided. An empty cell in the table 8 indicates that there is no transform application 12*a*, *b* . . . *n* available to perform the transformation from the source file format of the row including the cell to the destination file format of the column including the cell. If there is a transform application 12*a*, *b* . . . *n* available, then the file path and name of the executable transform application 12*a*, *b* . . . *n* is included in the cell for the transformation from the "From" file format (row) to the "To" file format (column). For instance, the application program 12*a*, *b* . . . *n* identified in cell (i, j) would transform the source file format of row i to the destination file format of column j.

Figure 3:
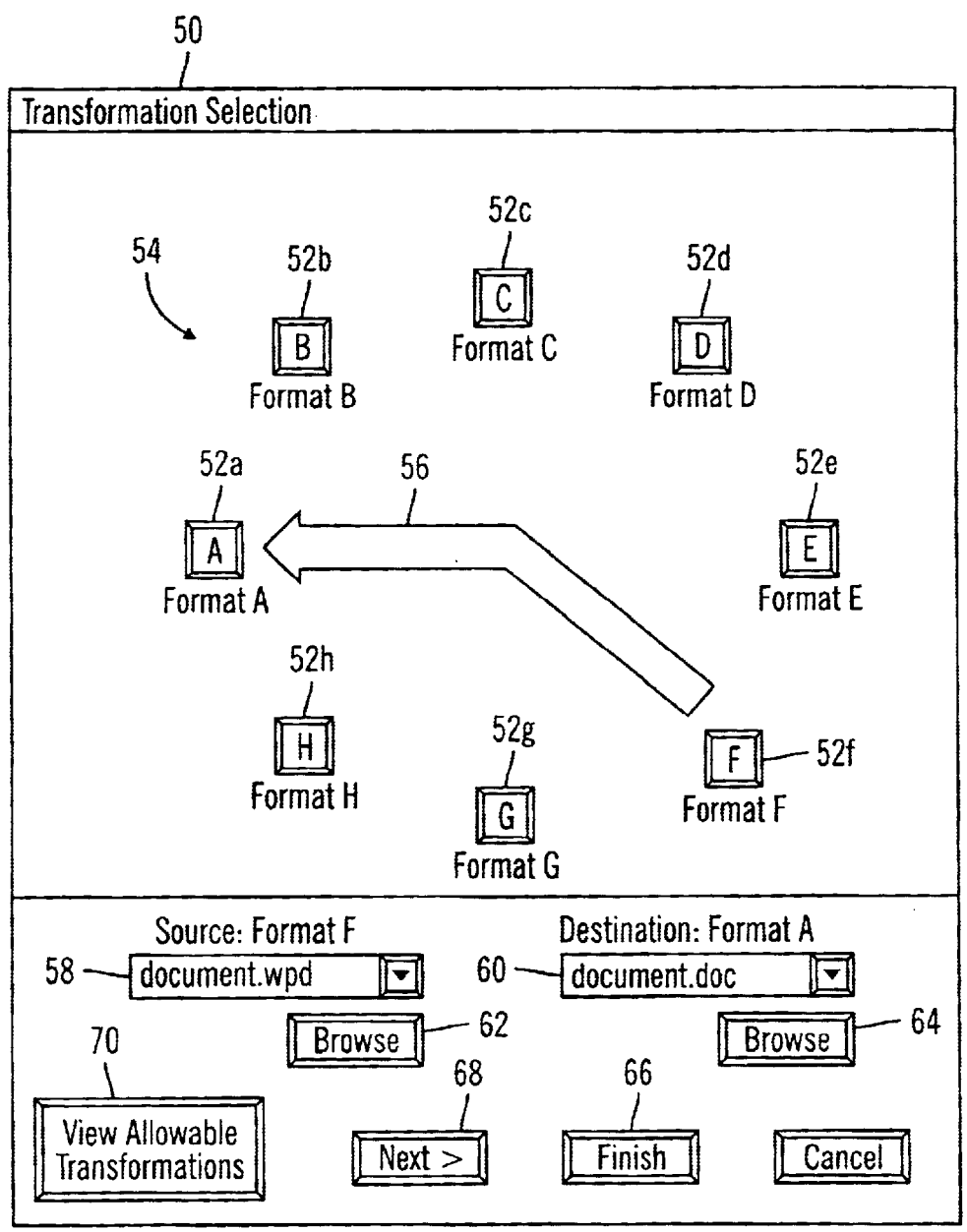
FIG. 3 illustrates a graphical representation of a selected transform to perform from a selected source file format to a selected destination file format in accordance with implementations of the invention.

FIG. 3 illustrates an example of a graphical user interface (GUI) 50 used to enable a user to select a transformation to perform on a selected source file in one source file format to a selected destination file having the same or equivalent data in a different destination file format. The user may use an input device 14 (FIG. 1), such as a mouse, pen stylus, etc., to select a source file format by selecting a graphical representation of one displayed file format 52*a, b, c, d, e, f, g, h* on a displayed format dial 54. The graphical representation of a file format may comprise an icon typically used to represent the file format and a name of the file format. Alternative graphical representations may also be used to represent the file formats in the display. For instance, the user may select the source file format 52*a* . . . *h* by clicking a button on the mouse, e.g., the left button, while the mouse pointer is positioned over the selected displayed file format icon 52*a* . . . *h*. Similarly, the user may select the destination file format by clicking another button on the mouse input device, e.g., the right button, while the mouse pointer is positioned over the selected displayed file format icon 52*a* . . . *h*. If the user attempted to select a source and destination file for which there was no available transform application 12*a, b* . . . *n* to perform the file transformation, then the transform tool 6 could display a message or other alert that such a source or destination file format cannot be selected for transformation.

Additionally, upon selecting a source file format, the transform tool 8 may then display those file formats 52*a* . . . *h* for which there is no available transform application 12*a* . . . *n* from the selected source file format as "greyed-out" and unselectable to indicate that such "greyed-out" formats cannot be selected as a destination format for the already selected source file. In such implementations, the user would be unable to select the "greyed-out" file format as the destination file format.

The GUI 50 of FIG. 3 further displays a graphical representation 56 of the transformation to perform in the form of an arrow extending from the user selected source file format 52*f* to the user selected destination file format 52*a*. Additionally, other types of graphical representations may be used to illustrate the transform operation that will be performed After the user selects the source and destination file formats from the graphical representations 52*a, b* . . . *h* on the displayed format dial 54, the user may then select specific files in the selected file formats to transform by using the input device 14 to enter the source and destination file names in the source and file entry boxes 58 and 60, respectively, or by using the browse buttons 62 and 64 to invoke a file navigator to navigate a file directory to enable selection of the source and destination files through a navigation window (not shown). If the navigation window is used, then in displaying files to select for the source and destination entry fields 58 and 60, the transform tool 6 may only display files having types of the selected source and destination file formats, respectively.

Selection of the finish button 66 would perform the selected transformation, as shown in the dial, from a selected source file 58 to the selected destination file 60. For certain transformation types, the user may select various attributes for the transformation. For instance, in transforming a text document or image built using a design program to another format for the text or image, e.g., a Joint Photographic Experts Group (JPEG) file, Adobe Acrobat Portable Document Format (PDF) file, a Graphics Interchange Format (GIF) file, etc., the user may select certain settings for the transformation, such as the quality of the resulting image, finishing, resolution, compression format, etc. If attributes are available for user selection, then a Next button 68** is enabled to display a further GUI panel in which the user may select various attributes of the transformation. Another example of where attributes may be selected is a transformation from one program format, such as a model file (e.g., a file in the Unified Modeling Language), to another program format, such as the program code implementing the model, e.g., Java. For instance, the user may define or specify mappings of classes in the model file to the source code to utilize when performing the transformation. If there are multiple types of attributes to set for the transformation, then multiple entry panels may be provided.

Figure 4:
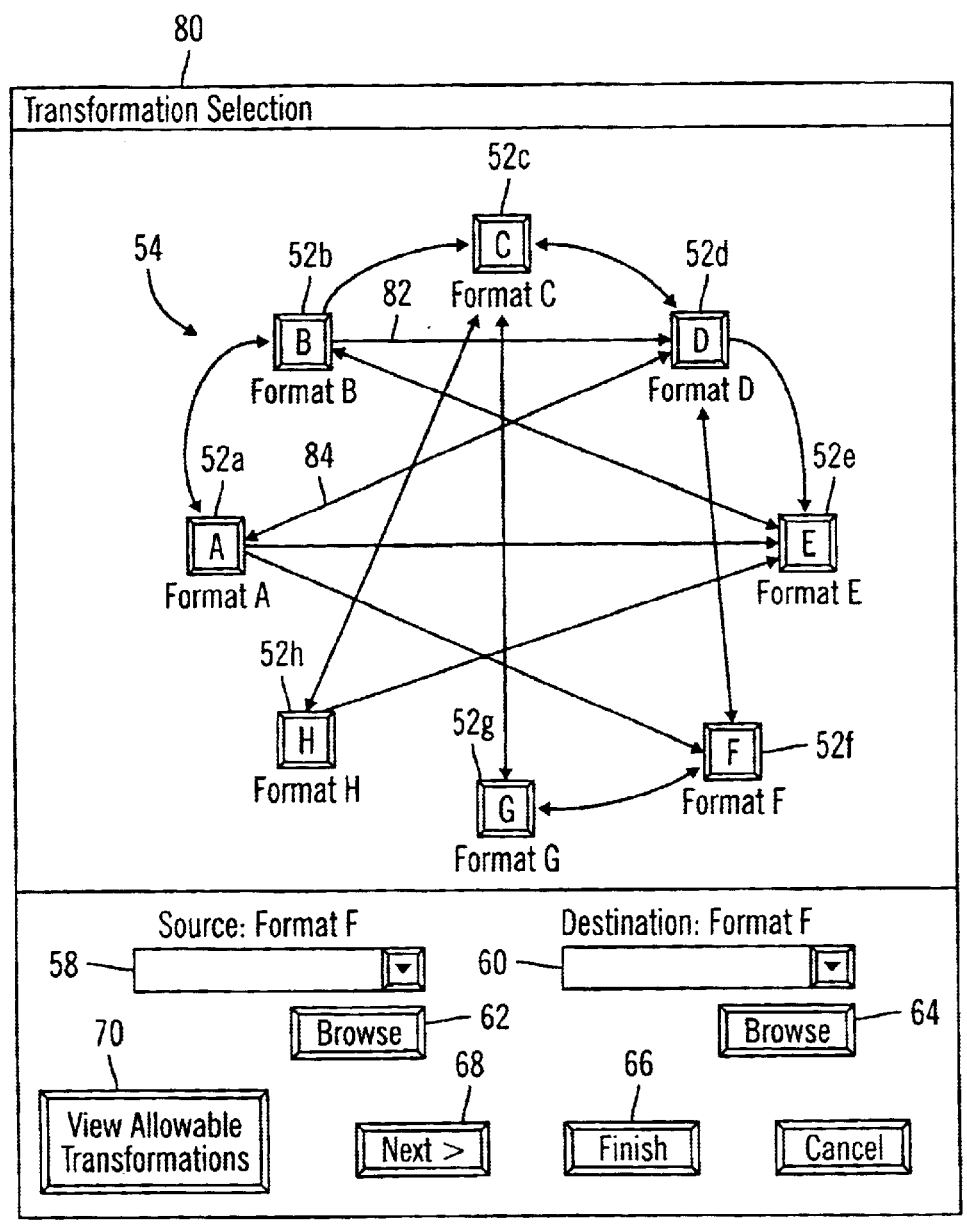
FIG. 4 illustrates a graphical representation on available transforms for transforming source file formats to destination file formats in accordance with implementations of the invention.

Selection of the view allowable transformations button 70 would generate in the format dial 54 a graphical representation of all possible transformations that may be performed by the transform applications 12*a, b* . . . *n* between the different file formats. FIG. 4 illustrates an example of the GUI 80 displayed upon selection of the view allowable transformations button 70. As shown in FIG. 4, the format dial 54 now displays lines illustrating the possible transformations. A one-way arrow, e.g., arrow 82, indicates that a transformation can occur from the file format at the end of the line opposite the arrow (e.g., file format B) to the file format at the end of the line with the arrow (e.g., file format D). A two way arrow, e.g., arrow 84, indicates that the transformation can occur both ways between the two file formats (e.g., transformation either way from file format A to file format D). If there is no line connecting two file formats, e.g., file formats A and H, then no transformation is available to transform a file between those two formats.

Figure 5:
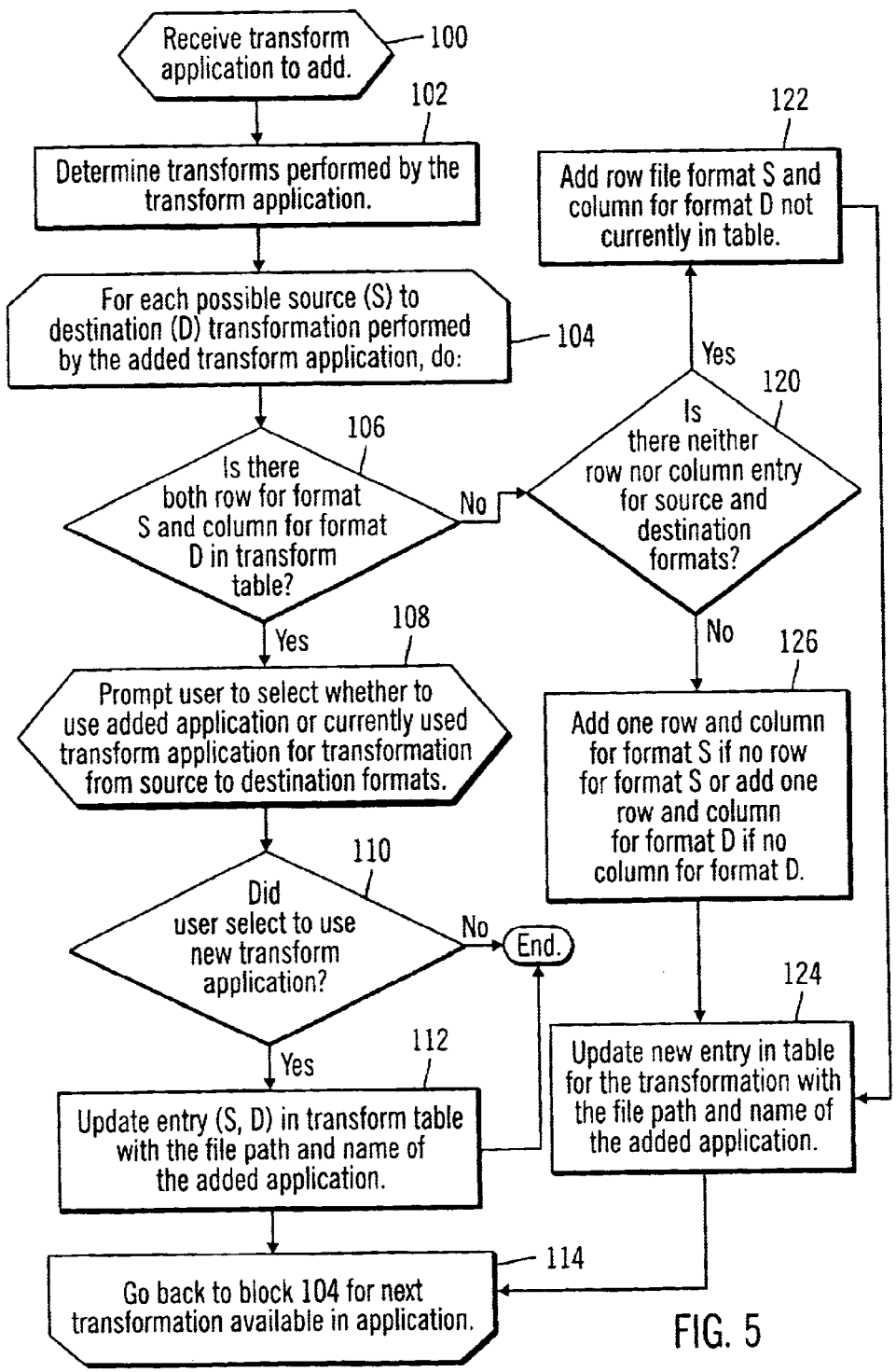
FIG. 5 illustrates logic to add a new transform to the available transforms for transforming source file formats to destination file formats in accordance with implementations of the invention.

The above described graphical user interface provides an integrated tool that enables a user to observe all available transformations that are possible and select files to transform. FIG. 5 illustrates logic implemented in the transformation tool 6 to add a transform application 12*a, b* . . . *n* to the transformations that can be performed by the tool 6. Control begins at block 100 with the transform tool 6 receiving a transform application 12*a, b* . . . *n* to add to the available transformations. The transform tool 6 determines (at block 102) the transforms performed by the added transform application 12*a, b* . . . *n*. Such information may be maintained in metadata included with the added transform application. A loop is then performed from blocks 104 through 126 for each possible source (S) file format to destination (D) file format transform performed by the added transform application 12*a, b* . . . *n*. At block 106, the transform tool 6 determines whether there is both a row for file format S and a column for file format (D) in the transform table 8 with a file path entry, i.e., the transformation from the source (S) to the destination (D) file format the added transform application performs is already performed by the transform tool 6. If the transformation from the source (S) to destination (D) file formats is already handled by one of the current transform applications 12a, b . . . n, then the transform tool 6 prompts (at block 108) the user to select whether to use the added transform application 12a, b . . . n or to continue using the currently used transform application 12a, b . . . n. If (at block 110) the user selected to use the new transform application for the transformation from the source (S) file format to destination (D) file format being considered, then the entry (S, D) in the transform table 8 is updated with the file path and name of the added transform application 12a, b . . . n, whereby the new added transform application 12a, b . . . n will be available to the transform tool 6 to handle transformations from file format S to file format D.

If (at blocks 108 and 120) there is neither a row nor column in the transform table 8 for the source (S) and destination (D) file formats being considered, respectively, then the transform tool 6 adds (at block 122) a row and column to the transform table 8 for the source (S) and destination (D) file formats, respectively, and then updates (at block 126) the new entry (S, D) in the table 8 with the file path and name of the added transform application 12a, b . . . n. If there is one of a row in the transform table for file format S or a column for file format D (from the no branch of block 120), then the transform tool 6 adds (at block 126) one row and column for file format S if there is no such row or adds one row and column for file format D if there is no such column and then proceeds to block 124 to update the new entry (S, D) with the file path and name of the added transform application 12a, b . . . n.

Figure 6:
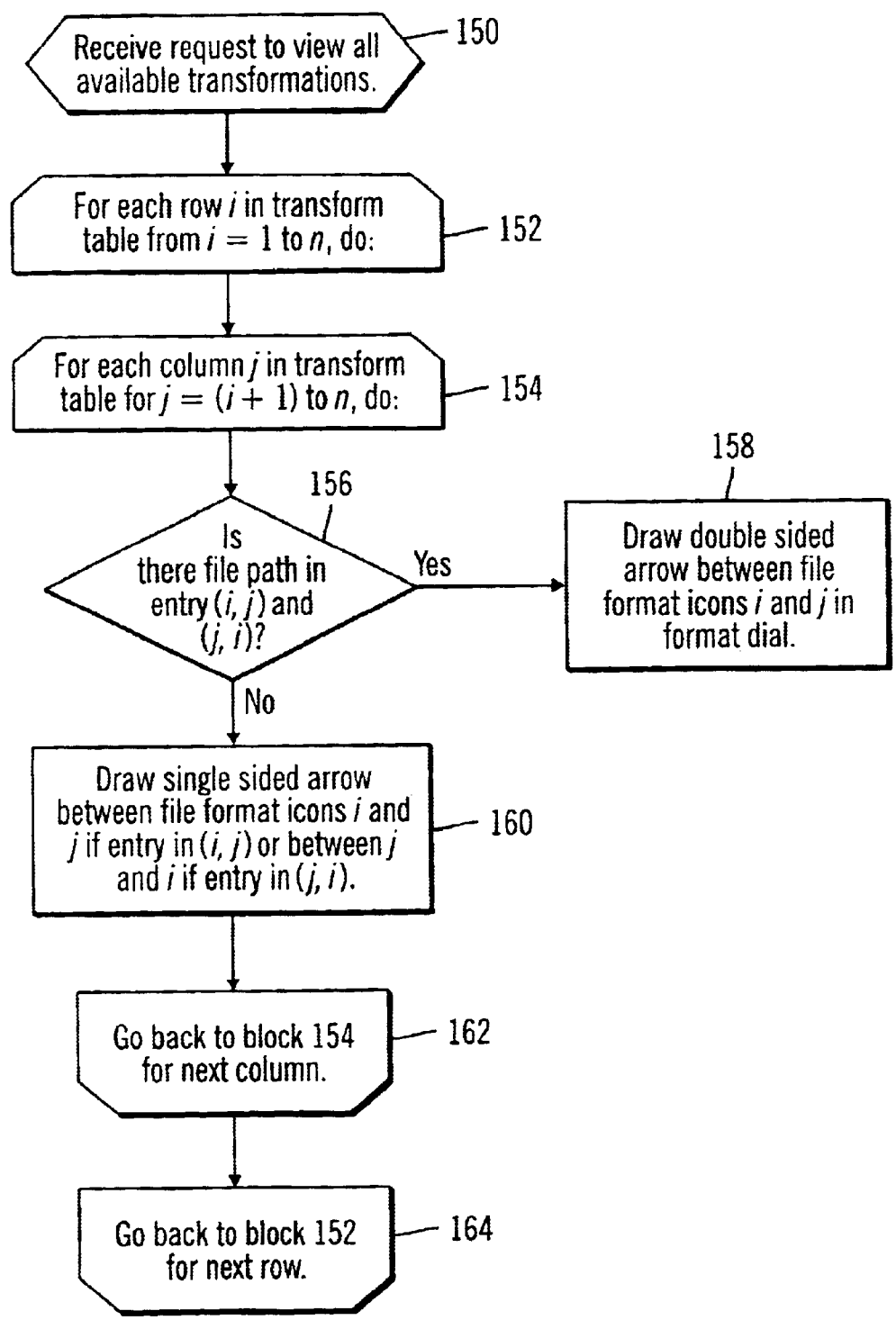
FIG. 6 illustrates logic to generate a graphical representation of all available transforms from source file formats to destination file formats in accordance with implementations of the invention.

With the logic of FIG. 5, the transform tool 6 is able to dynamically add transform applications 12a, b . . . n to expand the file format transform capabilities of the tool 6. If a transform application 12a, b . . . n is removed, then the transform table 8 would be updated to remove the entries in the transform table 8 that reference the removed transform application 12a, b . . . n so that the transform tool 6 will not attempt to invoke the 4riR removed transform application 12a, b . . . n to handle the transformation. After removing one transform application 12a, b . . . n, the transform tool 6 may determine whether another transform application 12a, b . . . n can handle the transforms handled by the removed transform application and, if so, update the transform table 8 to include a reference to the remaining transform application 12a, b . . . n capable of handling the transformation previously performed by the removed transform application 12a, b . . . n FIG. 6 illustrates logic implemented in the transform tool 6 to process a request (at block 150) from the user to view all allowable transformations. The user may make such a request by selecting the view allowable transformations button 70 (FIGS. 3 and 4) or some other input selection. The transform tool 6 performs a loop at blocks 152 through 164 for each row i in the transform table from i equals 1 to n, where the transform table 8 is an n×n matrix. An inner loop is then performed for each row i from blocks 154 through 162 for each column j, for j equals (i+1) through n. Within the inner loop, if (at block 156) there is a file path included in both the entry (i, j) and entry (V, i), indicating that transform applications 12a, b . . . n are available to transform both ways from file format i to file format j, then the transform tool 6 draws in the window 80 (FIG. 4) a double sided arrow between the graphical representations of file format i and j, indicating that files can be transformed both ways between the formats i and j. At block 160, if there is a file path entry (i, j), then a single sided arrow is drawn from icon i to icon j or if there is a file path in entry (j, i), then a single sided arrow is drawn from icon j to icon i. If there is no transform application 12a, b . . . n available for performing a transform either way from file format i to file format j, then no arrow is drawn there to indicate no available transform between the two file formats.

Figure 7:
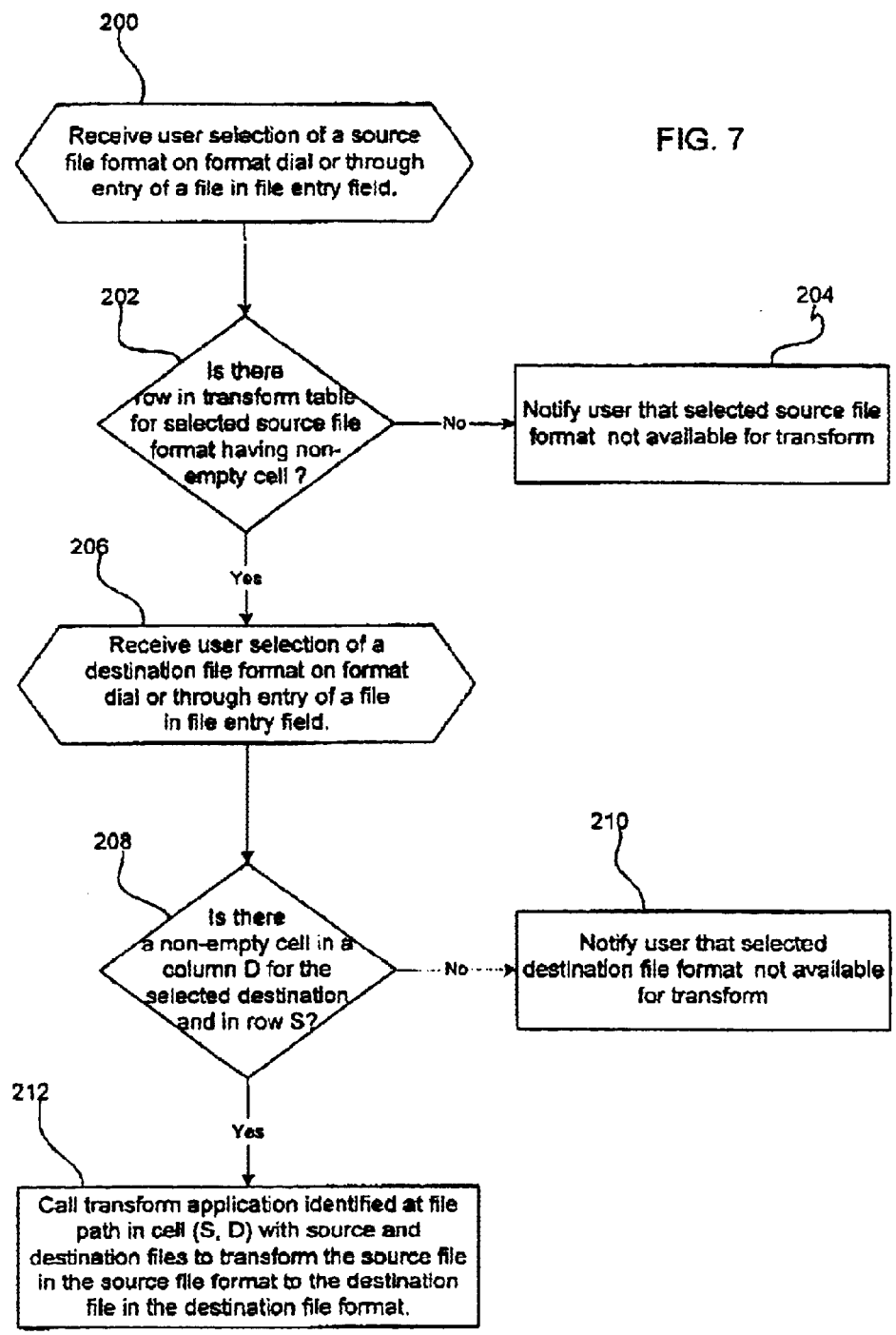
FIG. 7 illustrates logic to transform a user selected source file format to a user selected destination file format in accordance with implementations of the invention.

FIG. 7 illustrates logic implemented in the transform tool 6 to process user selections of file formats in the windows 50 displayed in FIGS. 3 and 4. At block 200, the transform tool 6 receives user selection of a source file format. This selection may be made using an input device 14 to select one of the displayed graphical representations of the file formats 52a, b . . . h on the format dial 54 or through entry of a file name in the source file entry field 58 (FIGS. 3 and 4), wherein the source file format comprises the file format of the entered file. If (at block 202) there is not a row in the transform table 8 for the selected source file format having a non-empty cell, then the transform tool 6 alerts (at block 204) the user that the selected source file type cannot be transformed to another file format, i.e., there is no transform application 12a, b . . . n available to transform from the selected source file format to another file format. Otherwise, if there is a row with a non-empty cell in the transform table 8 for the selected source file format, then the transform tool 6 waits (at block 206) to receive user selection for a destination file format on the format dial 54 or through entry of a file in the file entry field 60 (FIGS. 3 and 4), wherein the file format of the entered destination file comprises the selected destination file format. If (at block 208) there is a non-empty cell at entry S, D, i.e., the source (S) file format row and the destination (D) file format column, then the transform tool 6 calls (at block 212) the transform application 12a, b . . . n identified at the file path and name in entry (S, D) in the transform table 8, with the source and destination files to transform as parameters, to transform the user selected source file in the source file format to the user selected destination file in the destination file format. Otherwise, if the entry (S, D) in the transform table 8 is empty, then the transform tool 6 notifies the user that the selected destination file format is not available for transformation, i.e., there is no transform application 12a, b . . . n available to perform the transformation from the selected source file format to the selected destination file format. As discussed, in certain implementations, the transform tool 6 will not allow the user to select a destination file format for which there is no transform from the selected source file format to destination file format. As discussed, those file formats for which there is no available transform application 12a, b . . . n from the source file format are displayed as unselectable. e.g., greyed-out.

Figure 8:
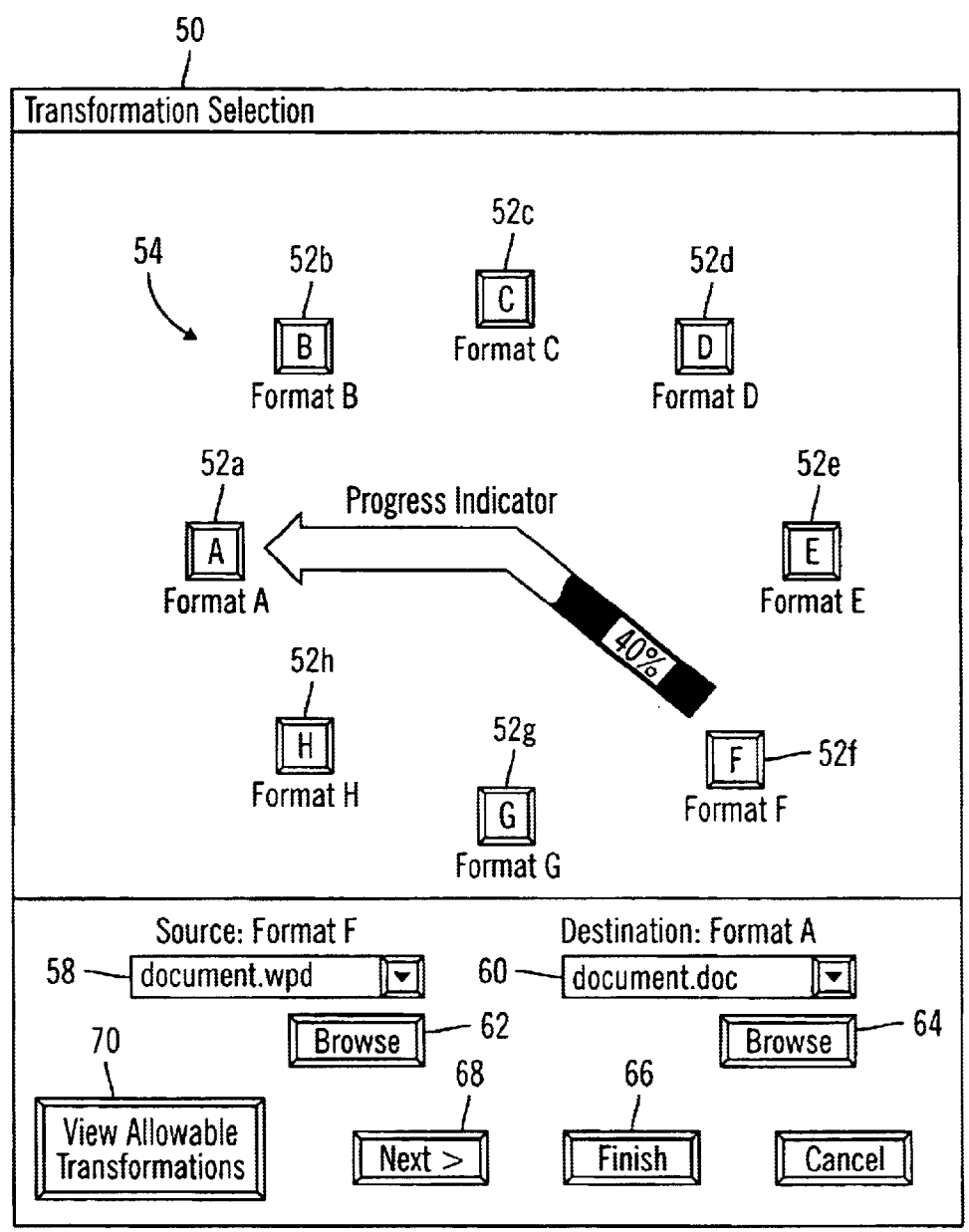
FIG. 8 illustrates a graphical representation of a selected transform to perform including a graphical representation of a progress bar indicating a percentage of the transform operation that has completed in accordance with implementations of the invention.

FIG. 8 illustrates a further implementation of the GUI shown in FIGS. 3 and 4, where the transform tool 6 further generates a display of a progress bar visually indicating the percentage progress of the transform application 12a, b . . . n in transforming the user selected source file in the source file format to the user selected destination file in the destination file format.

Additional Implementation Details

The described transform tool and transform applications may be implemented as a method, apparatus or article of manufacture using standard programming and/or engineering techniques to produce software, firmware, hardware, or any combination thereof. The term "article of manufacture"

as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the format dial and arrows drawn between the nodes of the dial, as shown in FIG. 4, were used to illustrate the available file transformations. For instance, icons representing the different file formats may be displayed at the file format nodes 52*a, b . . . h*. Alternatively, different graphical techniques may be used to illustrate the available file transform operations. For instance, file transform formats may be displayed in columnar format side-by-side and lines drawn between the listed file formats to show available transformations. Alternative display techniques may be used to display the available transformations for multiple file formats.

In the described implementations, the transform table 8 was used to indicate the available file transforms, where an entry at row i and column j is capable of providing a transform application 12*a, b . . . n* from file format i to file format j. Those skilled in the art will appreciate that alternative data structures may be used to indicate available transformations between file formats and the location of transform applications 12*a, b . . . n* to perform such file format transformations. Additionally, the transform table 8 may have dimensions and/or a format different than those described herein, or be implemented in multiple tables or data structures.

In the described implementations, multiple transform applications 12*a, b . . . n* were available to perform the file format transformations. Alternatively, there may be one transform application capable of performing all the available file format transforms.

The logic of FIGS. 5, 6, and 7 is for illustrative purposes. Additional or alternative steps may be performed in addition to those illustrated in the logic. Further, the order of the steps in the preferred logic may also vary.

The foregoing description of the described implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transforming files from a source file format to a destination file format, comprising:

generating a data structure in a computer readable medium indicating available transforms from a plurality of source file formats to at least one destination file format;

generating a graphical representation of available transforms from the source file formats to the at least one destination file format based on the available transforms indicated in the data structure;

receiving user input indicating a selected source file having a source file format and a selected destination file having a selected destination file format, wherein the data structure indicates one available transform to transform the selected source file format to the selected destination file format; and transforming the selected source file in the source file format to the selected destination file in the destination file format.

2. The method of claim 1, further comprising:

receiving a new transform to add to the data structure, wherein the new transform is capable of transforming at least one source file format to at least one destination file format; and updating the data structure to indicate as available the new transform.

3. The method of claim 2, further comprising:

determining, before updating the data structure, whether the data structure indicates one available transform to perform a transformation of one source file format to one destination file format that is also capable of being performed by the new transformation; and requesting user input selecting one of the determined available transform or the new transform to use to transform the source file format to the destination file format if both the available transform and new transform are capable of performing the transformation.

4. The method of claim 1, further comprising:

generating a graphical representation of a transformation operation to be displayed between a graphical representation of the selected source file format and a graphical representation of the selected destination file format.

5. The method of claim 4, wherein the generated graphical representation of the transformation operation comprises an arrow displayed from the graphical representation of the selected source file format to the graphical representation of the selected destination file format.

6. The method of claim 4, further comprising:

generating a progress bar to display with the graphical representation of the transformation operation indicating an approximate percent completion of the transformation operation of the selected source file to the selected destination file.

7. The method of claim 1, further comprising:

determining whether the data structure indicates at least one available transform for the selected source file format; and generating indication that there is no available transform for the selected source file format if the data structure does not indicate at least one available file transform for the selected source file format.

8. The method of claim 7, further comprising:

determining whether the data structure indicates at least one available transform to transform the selected source file format to the selected destination file format; and generating indication that there is no available transform for the selected destination file format if the data structure does not indicate at least one available transform for the selected source file format to the selected destination file format.

9. The method of claim 1, further comprising:

receiving user selection of attributes for the transform from the selected source file to the selected destination file, wherein the user selected attributes are used to control the step of transforming the selected source file to the selected destination file.

10. A method for transforming files from a source file format to a destination file format, comprising:

generating a data structure in a computer readable medium indicating available transforms from a plurality of source file formats to at least one destination file format;

generating graphical representations of each file format indicated as one source or destination file format in the data structure;

generating a graphical association for each source file format and destination file format pair for which there is one available transform indicated in the data structure;

receiving user input indicating a selected source file having a source file format and a selected destination file having a selected destination file format, wherein the data structure indicates one available transform to transform the selected source file format to the selected destination file format; and transforming the selected source file in the source file format to the selected destination file in the destination file format.

11. The method of claim 10, further comprising:

displaying entry fields in which the user input indicating the source file and destination file are entered.

12. The method of claim 11, further comprising:

enabling access to a file navigator for selection of the source and destination files in the displayed entry fields;

displaying, with the file navigator, only files in the selected source file format when the file navigator is invoked to select the source file; and displaying, with the file navigator, only files in the selected destination file format when the file navigator is invoked to select the destination file.

13. The method of claim 10, wherein generating the graphical association for each source file format and destination file format pair further comprises:

generating a line to display between the graphical representations of the source file format and destination file format to indicate the availability of one transform to transform the source file format to the destination file format.

14. The method of claim 13, wherein generating each line further comprises generating at least one arrow on the line indicating a direction of the transformation from the source file format to the destination file format.

15. The method of claim 14, wherein generating each line further comprises generating two arrows on the line to indicate at least one available transform to transform the source file format to the destination file format and transform the destination file format to the source file format if there is at least one available transform to perform transformations between the source file format and the destination file format.

16. The method of claim 14, wherein the graphical representations are generated to be displayed in a circular arrangement.

17. A method for transforming files from a source file format to a destination file format comprising:

generating a data structure in a computer readable medium indicating available transforms from a plurality of source file formats to at least one destination file format, wherein the data structure further indicates at least one program to perform the available transforms from the plurality of source file formats to the at least one destination file format; and generating a graphical representation of available transforms from the source file formats to the at least one destination file format based on the available transforms indicated in the data structure:

receiving user input indicating a selected source file having a source file format and a selected destination file having a selected destination file format, wherein the data structure indicates one available transform to transform the selected source file format to the selected destination file format; and transforming the selected source file in the source file format to the selected destination file in the destination file format by calling the program indicated in the data structure to transform the selected source file in the source file format to the selected destination file in the destination file format.

18. A system for transforming files from a source file format to a destination file format, comprising:

a display monitor;

a computer readable medium;

means for generating a data structure in the computer readable medium indicating available transforms from a plurality of source file formats to at least one destination file format;

means for generating on the display monitor a graphical representation of available transforms from the source file formats to the at least one destination file format based on the available transform, indicated in the data structure;

means for receiving user input indicating a selected source file having a source file format and a selected destination file having a selected destination file formal, wherein the data structure indicates one available transform to transform the selected source file format to the selected destination file format; and means for transforming the selected source file in the source file format to the selected destination file in the destination file format.

19. The system of claim 18, further comprising:

means for receiving a new transform to add to the data structure, wherein the new transform is capable of transforming at least one source file format to at least one destination file format; and means for updating the data structure to indicate as available the new transform.

20. The system of claim 19, further comprising:

means for determining, before updating the data structure, whether the data structure indicates one available transform to perform a transformation of one source file format to one destination file format that is also capable of being performed by the new transformation; and means for requesting user input selecting one of the determined available transform or the new transform to use to transform the source file format to the destination file format if both the available transform and new transform are capable of performing the transformation.

21. The system of claim 18, further comprising:

means for generating a graphical representation of a transformation operation to be displayed between a graphical representation of the selected source file format and a graphical representation of the selected destination file format.

22. The system of claim 21, wherein the generated graphical representation of the transformation operation comprises an arrow displayed from the graphical representation of the selected source file format to the graphical representation of the selected destination file format.

23. The system of claim 21, further comprising:

means for generating a progress bar to display with the graphical representation of the transformation operation indicating an approximate percent completion of the transformation operation of the selected source file to the selected destination file.

24. The system of claim 18, further comprising:

means for determining whether the data structure indicates at least one available transform for the selected source file format; and means for generating indication that there is no available transform for the selected source file format if the data structure does not indicate at least one available file transform for the selected source file format.

25. The system of claim 24, further comprising:

means for determining whether the data structure indicates at least one available transform to transform the selected source file format to the selected destination file format; and means for generating an alert indicating that there is no available transform for the selected destination file format if the data structure does not indicate at least one available transform for the selected source file format to the selected destination file format.

26. The system of claim 18, further comprising:

means for receiving user selection of attributes for the transform from the selected source file to the selected destination file, wherein the user selected attributes are used to control the step of transforming the selected source file to the selected destination file.

27. A system for transforming files from a source file format to a destination file format, comprising:

a display monitor;

a computer readable medium;

means for generating a data structure in the computer readable medium indicating available transforms from a plurality of source file formats to at least one destination file format;

means for generating on the display monitor graphical representations of each file format indicated as one source or destination file format in the data structure;

means for generating on the display monitor a graphical association for each source file format and destination file format pair for which there is one available transform indicated in the data structure;

means for receiving user input indicating a selected source file having a source file format and a selected destination file having a selected destination file format, wherein the data structure indicates one available transform to transform the selected source file format to the selected destination file format; and means for transforming the selected source file in the source, file format to the selected destination file in the destination file format.

28. The system of claim 27, further comprising:

means for displaying on the display monitor entry fields in which the user input indicating the source file and destination file are entered.

29. The system of claim 28, further comprising:

means for enabling access to a file navigator for selection of the source and destination files in the displayed entry fields;

means for displaying on the display monitor, with the file navigator, only files in the selected source file format when the file navigator is invoked to select the source file; and means for displaying on the display monitor, with the file navigator, only files in the selected destination file format when the file navigator is invoked to select the destination file.

30. The system of claim 27, wherein the means for generating the graphical association for each source file format and destination file format pair further performs:

generating on the display monitor a line between the graphical representations of the source file format and destination file format to indicate the availability of one transform to transform the source file format to the destination file format.

31. The system of claim 30, wherein the means for generating each line further generates at least one arrow on the line indicating a direction of the transformation from the source file format to the destination file format.

32. The system of claim 31, wherein the means for generating each line further generates two arrows on the line to indicate at learn one available transform to transform the source file format to the destination file format and transform the destination file format to the source file format if there is at least one available transform to perform the transformations between the source file format and the destination file format.

33. The system of claim 31, wherein the graphical representations are generated to be displayed in a circular arrangement.

34. A system for transforming files from a source file format to a destination file format, comprising:

a display monitor;

a computer readable medium:

means for generating a data structure in the computer readable medium indicating available transforms from a plurality of source file formats to at least one destination file format, wherein the data structure further indicates at least one program to perform the available transforms from the plurality of source file formats to the at least one destination file format;

means for generating on the display monitor a graphical representation of available transforms from the source file formats to the at least one destination file format based on the available transforms indicated in the data structure;

means for receiving user input indicating a selected source file having a source file format and a selected destination file having a selected destination file format, wherein the data structure indicates one available transform to transform the selected source file format to the selected destination file format; and means transforming the selected source file format to the selected destination file in the destination file format by calling the program indicated in the data structure to transform the selected source file in the source file format to the selected destination file in the destination file format.

35. An article of manufacture including code for transforming files from a source file format to a destination file format by:

generating a data structure in a computer readable medium indicating available transforms from a plurality of source file formats to at least one destination file format;

generating a graphical representation of available transforms from the source file formats to the at least one destination file format based on the available transforms indicated in the data structure;

receiving user input indicating a selected source file having a source file format and a selected destination file having a selected destination file format, wherein the data structure indicates one available transform to transform the selected source file format to the selected destination file format; and transforming the selected source file in the source file format to the selected destination file in the destination file format.

36. The article of manufacture of claim 35, further comprising:

receiving a new transform to add to the data structure, wherein the new transform is capable of transforming at least one source file format to at least one destination file format; and updating the data structure to indicate as available the new transform.

37. The article of manufacture of claim 36, further comprising:

determining, before updating the data structure, whether the data structure indicates one available transform to perform a transformation of one source file format to one destination file format that is also capable of being performed by the new transformation; and requesting user input selecting one of the determined available transform or the new transform to use to transform the source file format to the destination file format if both the available transform and new transform are capable of performing the transformation.

38. The article of manufacture of claim 35, further comprising:

generating a graphical representation of a transformation operation to be displayed between a graphical representation of the selected source file format and a graphical representation of the selected destination file format.

39. The article of manufacture of claim 38, wherein the generated graphical representation of the transformation operation comprises an arrow displayed from the graphical representation of the selected source file format to the graphical representation of the selected destination file format.

40. The article of manufacture of claim 38, further comprising:

generating a progress bar to display with the graphical representation of the transformation operation indicating an approximate percent completion of the transformation operation of the selected source file to the selected destination file.

41. The article of manufacture of claim 35, further comprising:

determining whether the data structure indicates at least one available transform for the selected source file format; and generating an alert indicating that there is no available transform for the selected source file format if the data structure does not indicate at least one available file transform for the selected source file format.

42. The article of manufacture of claim 41, further comprising:

determining whether the data structure indicates at least one available transform to transform the selected source file format to the selected destination file format; and generating an alert indicating that there is no available transform for the selected destination file format if the data structure does not indicate at least one available transform for the selected source file format to the selected destination file format.

43. The article of manufacture of claim 35, further comprising:

receiving user selection of attributes for the transform from the selected source file to the selected destination file, wherein the user selected attributes are used to control the step of transforming the selected source file to the selected destination file.

44. An article of manufacture including code for transforming files from a source file format to a destination file format by:

generating a data structure in a computer readable medium indicating available transforms from a plurality of source file formats to at least one destination file format;

generating graphical representations of each file format indicated as one source or destination file format in the data structure; and generating a graphical association for each source file format and destination file format pair for which there is one available transform indicated in the data structure; and receiving user input indicating a selected source file having a source file format and a selected destination file having a selected destination file format, wherein the data structure indicates one available transform to transform the selected source file format to the selected destination file format; and transforming the selected source file in the source file format to the selected destination file in the destination file format.

45. The article of manufacture of claim 44, further comprising:

displaying entry fields in which the user input indicating the source file and destination file are entered.

46. The article of manufacture of claim 45, further comprising:

enabling access to a file navigator for selection of the source and destination files in the displayed entry fields;

displaying, with the file navigator, only files in the selected source file format when the file navigator is invoked to select the source file; and displaying, with the file navigator, only files in the selected destination file format when the file navigator is invoked to select the destination file.

47. The article of manufacture of claim 44, wherein generating the graphical association for each source file format and destination file format pair further comprises:

generating a line to display between the graphical representations of the source file format and destination file format to indicate the availability of one transform to transform the source file format to the destination file format.

48. The article of manufacture of claim 47, wherein generating each line further comprises generating at least one arrow on the line indicating a direction of the transformation from the source file format to the destination file format.

49. The article of manufacture of claim 48, wherein generating each line further comprises generating two arrow on the line to indicate at least one available transform to transform the source file format to the destination file format and transform the destination file format to the source file format if there is at least one available transform to perform the transformations between the source file format and the destination file format.

50. The article of manufacture of claim 48, wherein the graphical representations are generated to be displayed in a circular arrangement.

51. An article of manufacture including code for transforming files from a source file format to a destination file format by:

generating a data structure in a computer readable medium indicating available transforms from a plurality of source file format to at least one destination file format, wherein the data structure further indicates at least one program to perform the available transforms from the plurality of source file formats to the at least one destination file format;

generating a graphical representation of available transforms from the source file formats to the at least one destination file format based on the available transforms indicated in the data structure;

receiving user input indicating a selected source file having a source file format and a selected destination file having a selected destination file format, wherein the data structure indicates one available transform to transform the selected source file format to the selected destination file format; and transforming the selected source file in the source file format to the selected destination file in the destination file format by calling the program indicated in the data structure to transform the selected source file in the source file format to the selected destination file in the destination file format.

* * * * *

UNITED STATES PATENT AND TRADEMARK OFFICE
CERTIFICATE OF CORRECTION

PATENT NO. : 6,862,601 B2
APPLICATION NO. : 09/934721
DATED : March 1, 2005
INVENTOR(S) : Gary Charles Doney et al.

It is certified that error appears in the above-identified patent and that said Letters Patent is hereby corrected as shown below:

Column 10
    Line 52, delete "formal" and insert --format--

Column 12
    Line 41, delete "learn" and insert --least--

Column 14
    Line 45, delete "and"

Column 15
    Line 21, delete "arrow" and insert --arrows--

Signed and Sealed this

Nineteenth Day of December, 2006

JON W. DUDAS
*Director of the United States Patent and Trademark Office*